G. McGREGOR & G. VOLL.
Sash-Locks.
No. 5,253. Reissued Jan. 21, 1873.
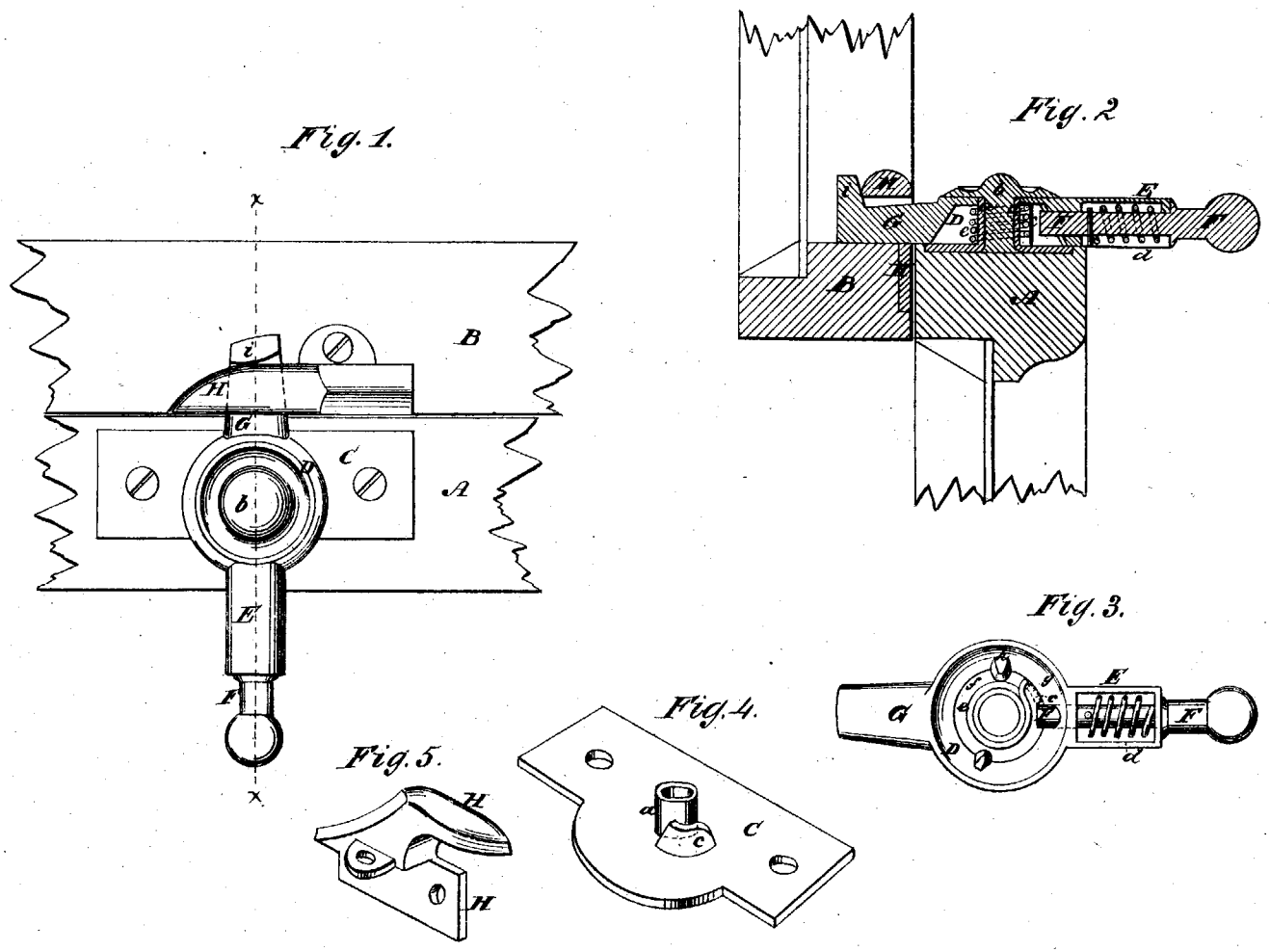
Witnesses:
E. Wolff
J. Felbel
Inventor:
Geo. McGregor & Geo. Voll
By their Attorney
J. N. McIntire.
AM. PHOTO-LITHOGRAPHIC CO. N.Y. (OSBORNE'S PROCESS.)

UNITED STATES PATENT OFFICE.

GEORGE McGREGOR AND GEORGE VOLL, OF CINCINNATI, OHIO, ASSIGNORS, BY MESNE ASSIGNMENTS, TO WILLIAM A. HOPKINS AND FREDERICK Z. DICKINSON.

IMPROVEMENT IN SASH-LOCKS.

Specification forming part of Letters Patent No. 88,318, dated March 30, 1869; reissue No. 5,253, dated January 21, 1873.

*To all whom it may concern:*

Be it known that we, GEORGE McGREGOR and GEORGE VOLL, of Cincinnati, in the county of Hamilton and State of Ohio, have invented certain new and useful Improvements in Sash-Locks; and we do hereby declare the following to be a full, clear, and exact description thereof, reference being had to the accompanying drawing and to the letters of reference marked thereon.

Previous to our invention sash-locks have been made in numerous forms, but the greater portion of them belong to one of two kinds, viz., either that class in which a vibratory lever of some sort is pivoted to a plate which is to be attached to the meeting-rail of the upper sash, and operates in conjunction with a "striking-plate" to be fastened to the meeting-rail of the lower sash, or that kind in which an oscillatory lever is pivoted to a plate, to be attached to the lower sash, and operates in conjunction with some sort of striking-plate to be attached to the upper sash.

Our lock or sash-fastener belongs to the last-named kind, and our improvements in this kind of sash-lock have for their objects to render it more efficient and desirable in its operation, while its construction shall be such as to combine neatness and simplicity with strength and durability. Our invention consists in the combination, with the oscillatory lever and the plate to which it is pivoted, of the spring-locking bolt and catch-segment, whereby the locking of said lever to said plate is effected, as will be hereinafter more fully set forth.

To enable those skilled in the art to make and use our invention, we will proceed to more fully describe the construction and operation of our improved sash-lock, referring by letters to the accompanying drawing, in which—

Figure 1 is a top view of one of our improved sash-locks, illustrated as attached to the meeting-rails of a pair of window-sashes. Fig. 2 is a vertical section at the line *x x* of Fig. 1. Figs. 3, 4, and 5 are detail views of the several parts.

In the several figures the same part is designated by the same letter of reference.

A represents the top rail of the lower, and B the bottom rail of the upper sash of a window, or what are commonly designated the two "meeting-rails" of the pair of sashes. C is the base-plate of the lock, which is secured by screws to the meeting-rail A, and which carries the oscillatory lever and its attachments; and H is the hook-shaped striking-plate, which is secured to the rail B, as shown, and with which the locking-lever engages, as will be presently explained. The peculiar form of this striking-plate is best seen in detail view at Fig. 5. The oscillatory lever of the lock is composed of or formed with a circular central portion, D, and two arms, E and G, one of which (E) is hollow and contains the body of bolt F and its spring *d*, while the other (G) is solid and formed with a projecting lip, *i*, which engages with the cam-like edge of hook portion H of the striking-plate. The plate C is formed with a hollow stud, *a*, the upper end of which passes into a hole in the circular portion D of the fastening-lever. A bolt, *b*, passes down through the hollow stud *a*, and is riveted at its lower end, and thus the plate or stand C and the locking mechanism and lever are united in such a manner that the lever is free to turn about the hollow stud *a* as an axis of motion. Around the hollow stud *a*, and within the hollow circular portion D of the lever, is arranged a coil-spring, *e*, the ends of which are slightly turned or bent outward so that one of them (*f*) rests against the projection *h* on the interior of D, while the other (*g*) comes against the projecting segment *c* of the lock-plate. By this arrangement the spring *e* is made to turn the lever back to its normal position, as will be presently explained. The retaining-bolt F is formed with a handle or head which protrudes from the hollow end E of the lever, as shown, and has its inner end so located relatively to the segmental projection *c* of the plate C that when the lever is turned into the position seen at Figs. 1 and 2, the said bolt will shoot past the edge of segment *c*, and thereby lock the lever in said position.

The operation of our improved fastener will be seen to be as follows: In order to lock the sashes it is only necessary to take hold of the head or outer end of bolt F and by it swing or oscillate the locking-lever on its center stud *a* until it assumes the position seen at Fig. 1, which is about at right angles to its normal position. In thus swinging the lever round about a quarter turn the solid arm G is made to pass under the hook-like portion of the striking-plate H to prevent any vertical movement of either sash, while at the same time the projecting lip *i* of the said arm G rides in contact with the inclined or cam-like edge of hook H, and effects the drawing together laterally of the sash. When the lever is in its normal condition the end of the spring-bolt F rests against the curved face of the segment *c*, but as the lever is turned on its stud *a* this bolt rides over the said surface of *c* until the lever has assumed about the position seen at Fig. 1, (necessary to draw together and fasten the sashes,) when said bolt shoots past the edge of segment *c*, and secures the lever positively in this position. When it is desired to unlock the sashes the lever must first be unlocked by pulling the bolt F endwise, when, by the action of the coiled spring *e*, the lever will be thrown round into its normal position, and the sashes be thus automatically unlocked.

It will be observed that the striking-plate is so formed that it may be secured to both the horizontal and vertical faces of the meeting-rail B, which induces to greater security against any strain intended to force the lock, and it will be seen, also, that while in our lock the desired results are most efficiently attained to, the operations are easily effected, and the whole fixture is neat in appearance and economic of manufacture, while strong and durable in the nature of its construction.

We are aware that sash-locks have been made embodying the idea of an oscillatory lever adapted to engage with a striking-plate, or other equivalent device, attached to the meeting-rail of the upper sash; and also that various devices have been suggested to steady or partially retain the locking-lever in place; and that various complex mechanisms have been devised for automatically locking the sash. None of these, however, lock the oscillatory lever to the plate to which it is pivoted independent of the striking-plate; and do not wish our claim of invention to be understood as relating to any such contrivances; but Having so fully described the construction and operation of our improved lock that those skilled can make and use it, what we claim therein, and desire to secure by Letters Patent, is—

The combination, with the oscillatory lever and the plate to which it is pivoted, of the spring-bolt F and catch-segment *c*, or their equivalents, whereby the locking of the said lever to the said plate is effected substantially as and for purpose set forth.

In testimony whereof we have hereunto set our hands and seals this 19th day of September, 1872.

GEORGE McGREGOR. [L. S.]
GEORGE VOLL. [L. S.]

In presence of—
HOWARD DOUGLASS,
JEROME D. CREED.